United States Patent [19]

Weber

[11] Patent Number: 4,465,016
[45] Date of Patent: Aug. 14, 1984

[54] METERING DEVICE FOR LIQUID TREATMENTS

[75] Inventor: Joseph A. Weber, Arlington, Tex.

[73] Assignee: Gustafson, Inc., Dallas, Tex.

[21] Appl. No.: 425,529

[22] Filed: Sep. 28, 1982

[51] Int. Cl.³ .............................................. B05C 5/00
[52] U.S. Cl. .................... 118/303; 118/417; 222/370; 222/109; 406/63
[58] Field of Search .................. 134/65; 222/108, 109, 222/345, 346, 370; 406/63, 64, 68, 66; 118/303, 417

[56] References Cited

U.S. PATENT DOCUMENTS

| | | |
|---|---|---|
| 2,406,239 | 8/1946 | Morgenroth . |
| 2,959,330 | 11/1960 | Charbonneau . |
| 2,984,388 | 5/1961 | Scarr et al. . |
| 3,076,580 | 2/1963 | Heath . |
| 3,195,776 | 7/1965 | Helm et al. . |
| 3,251,511 | 5/1966 | Lloyd . |
| 3,779,712 | 12/1973 | Calvert et al. . |
| 3,964,513 | 6/1976 | Molner . |
| 3,995,777 | 12/1976 | Diez et al. . |
| 4,023,525 | 5/1977 | Weber ................................ 118/303 |
| 4,167,896 | 9/1979 | Clements ........................... 118/303 |
| 4,284,243 | 8/1981 | Shaver . |

Primary Examiner—H. Grant Skaggs
Attorney, Agent, or Firm—Peterson, Palmatier, Sturm, Sjoquist & Baker, Ltd.

[57] ABSTRACT

A liquid chemical treatment measuring device as for metering treated chemicals for agricultural seeds. A housing containing a disc-like rotor sandwiched between stationary discs or headers, there being flat faces between the rotary disc and the stationary headers or discs. A rotary disc has a multiplicity of measuring chambers extending endways through its thickness. The stationary discs have supply and recirculation manifold grooves opposite each other and confronting the measuring chambers of the revolving disc, and also an inlet port and an overflow port producing continuous flushing of the measuring chambers and supply and recirculation grooves. The stationary discs or headers also have discharge and relief manifold grooves opposite each other and draining the liquid chemical treatment from the measuring chambers of the revolving rotor and supplying air into the chambers to allow rapid draining. The housing returns spilled and other quantities of liquid chemical treatment to be used for flushing to the reservoir for reuse.

19 Claims, 6 Drawing Figures

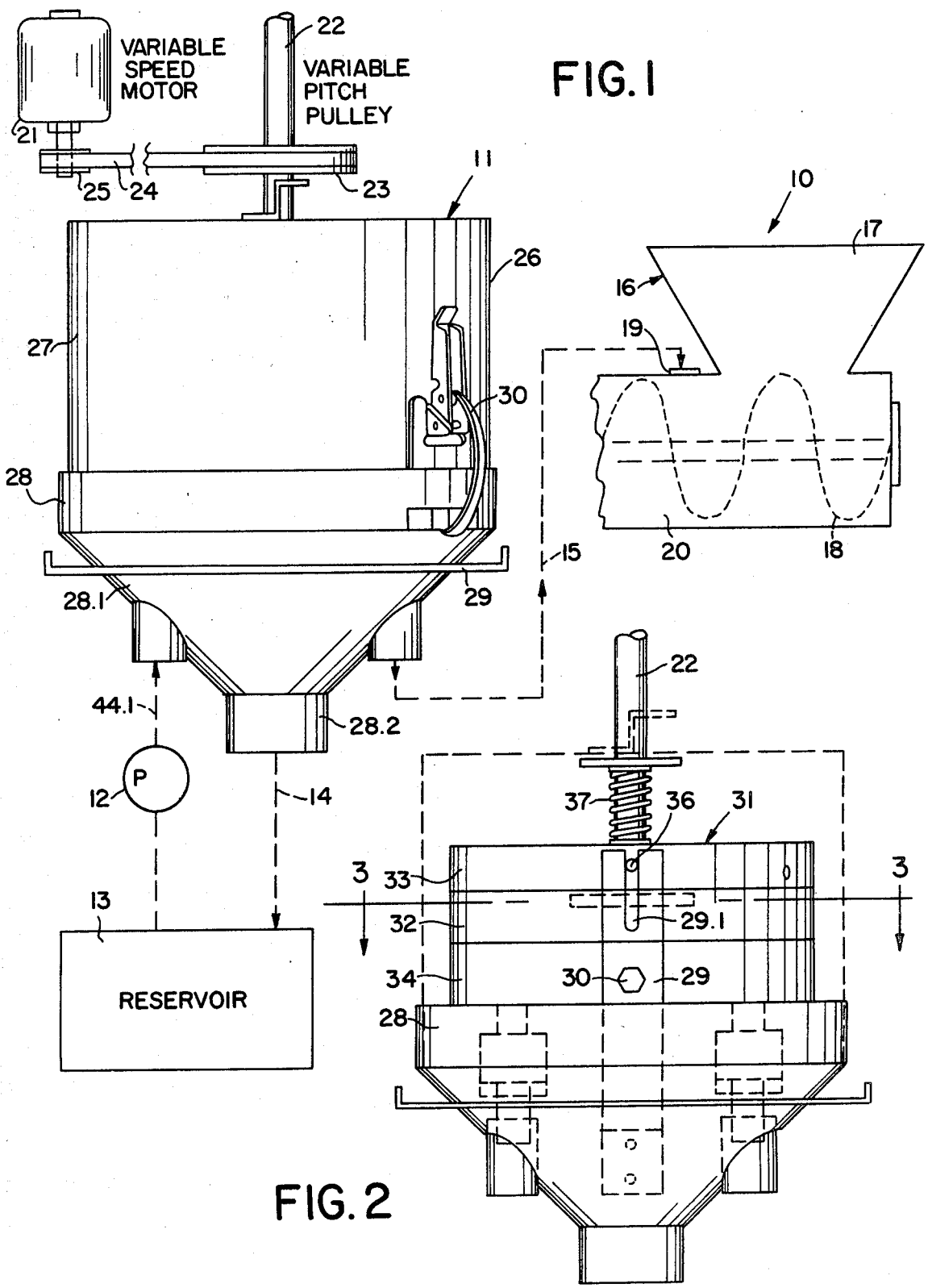

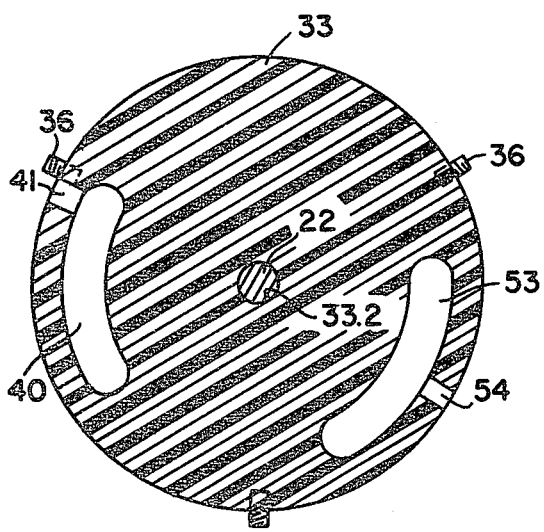
FIG. 3
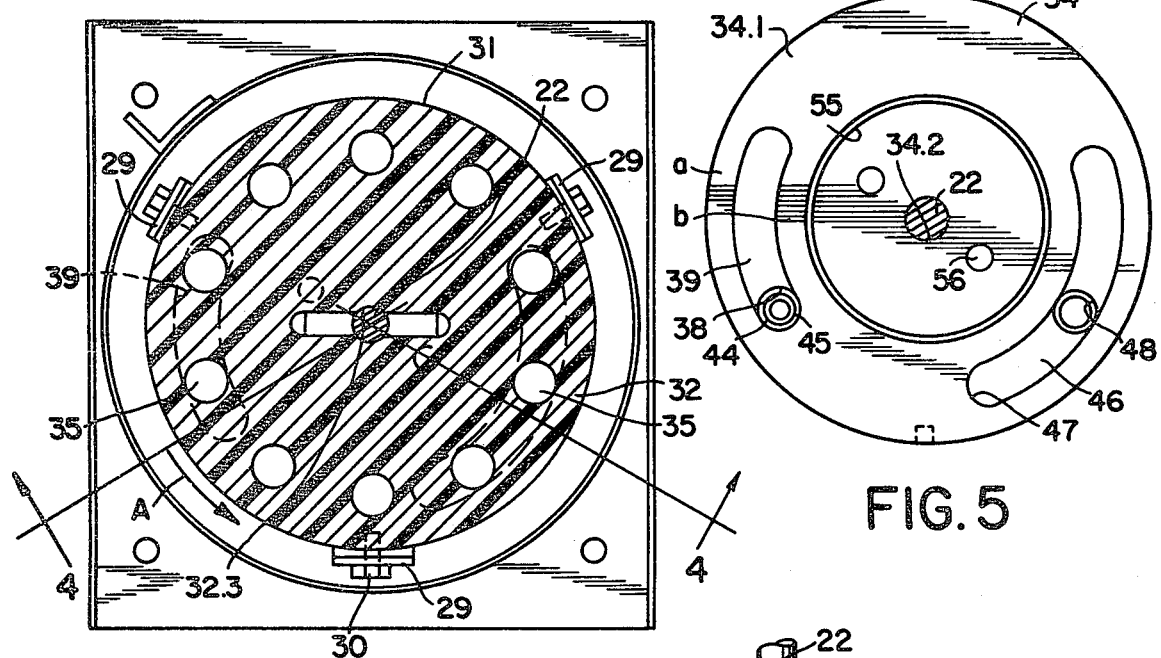
FIG. 5
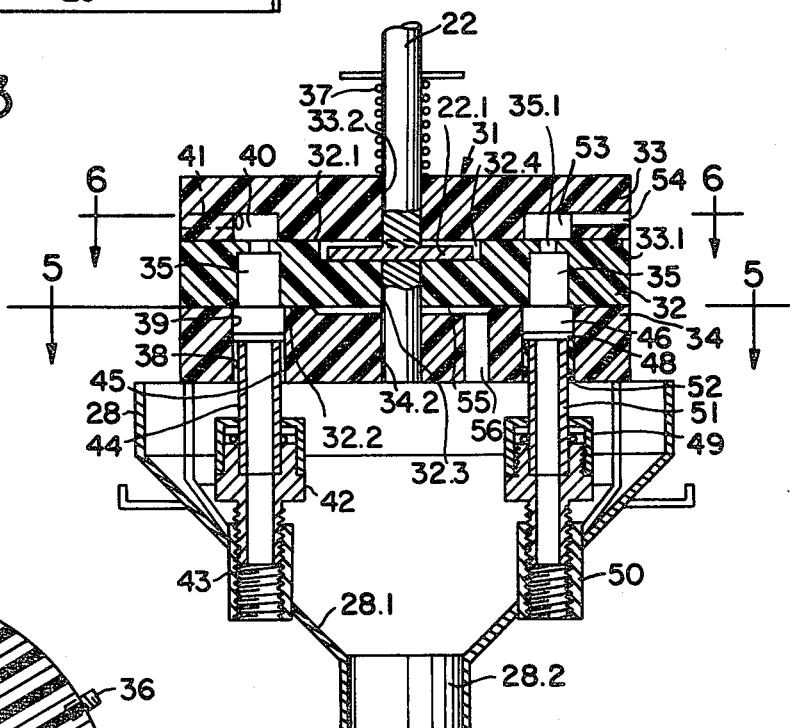
FIG. 4
FIG. 6

METERING DEVICE FOR LIQUID TREATMENTS

This invention relates to a metering device for liquids and more particularly for liquids which are laden with solids carried in suspension and having a propensity of settling out.

BACKGROUND OF THE INVENTION

Accurate measurement of liquids at low flow rates has always presented substantial problems. If such liquids are laden with solids which have a propensity of settling out, accurate metering of such liquids becomes more of a problem.

Metering devices often use cavities or chambers in revolving rotors, however, such measuring cavities or chambers often provide dead spots into which suspended solids will settle from the liquid carrier. Over a period of time, the settled solids will change the usable volume of such measuring cavities, and of course, metering errors will occur, and preset calibrations become inaccurate. Typical of such prior metering devices, and their inherent problems as relates to handling liquids laden with solids in suspension, are Helm U.S. Pat. No. 3,195,776; Lloyd U.S. Pat. No. 3,251,511; Calvert U.S. Pat. No. 3,779,712; and Diez U.S. Pat. No. 3,995,777.

SUMMARY OF THE INVENTION

An object of the invention is to provide a new and improved accurate and maintenance free apparatus for metering liquids and especially liquids laden with solids.

Another object of the invention is the provision of a novel liquid metering apparatus providing continuous flushing and cleaning of liquid metering chambers during operation.

A further object of the invention is the provision of an improved, self cleaning liquid metering apparatus which is especially adapted for liquids laden with suspended solids and which apparatus may be readily and easily disassembled and reassembled for changing metering capacities.

A feature of the invention is a stack of three nylon discs in an enclosure and having flat faces and lying flush against each other under spring pressure to seal against liquid leakage. The middle metering disc or rotor revolves while the other two end discs or headers remain stationary. The revolving metering disc has numerous holes or chambers entirely therethrough for measuring liquids.

Nylon is used in the discs because it is resistant to corrosive influences of various liquids, because it is machinable, and because nylon has dimensional stability and will retain its shape. Other corrosion resistant materials such as stainless steel might also be used in the discs.

The top and bottom discs or headers in the stack have supply and recirculation manifold grooves, respectively, opposite each other and in the faces confronting the metering disc to communicate with the measuring chambers. The bottom and top discs or headers have inlet and overflow ports, respectively, and each communicating with the adjacent manifold groove.

The inlet port in the bottom disc is supplied with liquid from a pressurized source, such as a pump, producing 3 to 4 psi. The overflow port in the top disc extends between the recirculation manifold groove and the outer peripheral edge of the disc to provide for discharge of air from the measuring chambers as they are filled and to spill overflow liquid into the enclosure for return to the pump reservoir.

An outlet port is adjacent the inlet port and in the same bottom disc or header. A drain manifold groove in the bottom disc with the outlet port confronts the revolving metering disc and measuring holes or chambers therein. A relief manifold groove is in the top disc and opposite the drain manifold groove and a relief port extends from the relief manifold to the edge of the disc to admit air, thereby allowing rapid draining of the liquid from the measuring holes as they revolve over the drain manifold groove.

The supply and recirculation manifold grooves span at least two measuring holes or chambers in the metering disc. Pumped liquid fills each of the measuring chambers passing by these manifold grooves and is continuously flushed through the measuring chambers and both manifolds, grooves, and a quantity of liquid continuously spills through the overflow port. The spanning by the grooves of at least two chambers also prevents buildup of any back pressure at the inlet.

Each filled measuring hole or chamber is sealed between the end discs or headers as the holes pass from the supply and recirculation manifold grooves to the drain manifold groove.

The nylon disc faces are smooth and lie flush against each other under spring pressure to prevent leakage and migration of pumped liquid to the drain manifold groove. The lineal distance between the supply and drain manifold grooves substantially exceeds the length of possibly leakage paths transversely from the supply manifold groove alternately to the outer edge of the discs and to a relief recess at the middle of the end disc or header.

A supply fitting loosely fits into the inlet port for delivering liquid from the pump. Liquid is allowed to cascade back into the enclosure surrounding the stack of discs and from the supply fitting simultaneously with filling the supply manifold groove and measuring chambers of the metering disc. Accumulation of settled solids at or near the inlet port is thereby prevented.

The discs may be readily lifted off to accommodate replacing the metering disc with another similar disc having measuring chambers of another size. Capacity of the metering device may thereby be easily changed.

Although it is preferred that the stack of discs be arranged so that the rotation axis is vertical, the discs may also be arranged so that rotation is on a horizontal or tilted axis, if the parts are arranged so that air can escape and enter freely to allow free flow of the liquids being metered.

A principle advantage is in the ability to meter liquids carrying solids in substantial proportions and to resist the corrosive effect of some chemicals. The device is particularly useful in metering seed treatments for fungicides, herbicides, etc., which are applied in rather small quantities to seeds being prepared for agricultural use. In seed treatments, the active chemicals are often solids suspended in the liquids, which are used as carriers. Because of the continuous flushing of the measuring holes or chambers in the revolving metering disc, there is no possibility of settling of the solids in the measuring chamber and therefore, the identical quantity of liquid is measured per revolution of the metering disc over a long period of operation which may extend for weeks or months.

Variation in the metering capacity is easily obtained by changing metering discs and by varying the speed of rotation, either by changing the motor speed or by using a speed changing transmission or variable speed pulley and belt for driving the metering disc.

BRIEF DESCRIPTION OF DRAWINGS

FIG. 1 is an elevation view of the metering device, and includes diagrammatic illustration of the environment in which the metering device may be used.

FIG. 2 is an elevation view with the cover removed, but having its location shown in dotted lines.

FIG. 3 is a detail section view taken approximately at 3—3 of FIG. 1.

FIG. 4 is a detail section view taken approximately along the broken line as indicated at 4—4 in FIG. 3.

FIG. 5 is a detail section view taken approximately at 5—5 of FIG. 4.

FIG. 6 is a detail section view taken approximately at 6—6 of FIG. 4.

DETAILED SPECIFICATION

One form of the invention is illustrated in the drawings and is described herein.

The treating apparatus, indicated in general by numeral 10, includes the metering device 11 which is supplied with liquid treating chemicals from a pump 12 and a reservoir 13 in which the liquid treating chemicals are temporarily stored. From the metering device 11 the overflow of treating chemicals is returned, as indicated at 14, from the metering device 11 to the reservoir 13. The metered treating chemicals are delivered through duct means 15 to the treating equipment 16 which, in the form illustrated, comprises a treater for agricultural seeds which are received in the hopper 17 and conveyed and agitated by an auger conveyor 18. The treating chemicals from the duct means 15 are delivered through a fitting on the auger tube so that the liquid treating chemicals are mixed immediately with the seed or grain being moved under the influence of the auger conveyor 18.

The treating device 11 is powered from a variable speed source of mechanical power which may include a variable speed electric motor 21, the output of which is connected to the drive shaft 22 of the metering device 11 by a belt and pulley assembly including a variable pitch pulley 23 and belt 24 and a pulley 25 on the motor drive shaft.

The metering device 11 includes a housing 26 having a cover 27 and a base 28 which has an external bracket plate 29 for mounting on a suitable frame for holding the metering device in a fixed location. The removable cover 27 has a number of latches 30 to accommodate the removal and replacement and securing of the cover on the base 28.

As seen in FIG. 4, the base 28 of the housing has a conical lower portion 28.1 and a discharge opening 28.2, to which a duct may be attached as by clamping for returning liquid to the reservoir 13.

The housing has rigid upright brackets 29, affixed as by welding, to the inner surface of the base 28. The upright rigid brackets 29 have slots 29.1 in their upper portions and are apertured to receive mounting screws.

The housing 26 confines the metering apparatus indicated in general by numeral 31, which includes a revolving metering disc or rotor 32 which is sandwiched between a pair of stationary discs or headers 33 and 34. All of the discs 32, 33 and 34 are formed of rigid nylon and are substantially identical in overall diameter and thickness, and are arranged in a stack concentric with the rotation axis of the rotary disc 32. Although the discs 32, 33 and 34 are made of nylon, they might be made of other corrosion resistant material, such as stainless steel.

The rotary metering disc 32 has flat upper and lower end faces 32.1 and 32.2 which lie normal to the rotation axis. The metering disc 32 also has a multiplicity of metering holes or chambers 35 located adjacent the outer periphery of the disc 32 and extending endways through the entire thickness of the disc 32 and through the end faces thereof. The metering chambers 35 may be entirely formed in one diameter through the entire thickness of the disc 32, but as illustrated, the metering chambers 35 may have smaller ports 35.1 adjacent the upper face 32.1 of the disc. The smaller ports 35.1 are sufficiently large as to be essentially non-restrictive to flow of treating liquid. This arrangement of the chambers 35 with a shoulder intermediate the length of each of the chambers accommodates adjusting the sizes of the chambers in various discs, by simply making the larger portions of the chambers either longer or shorter, depending upon the desired metering capacity.

The revolving disc 32 also has an axial opening 32.3 through which the drive shaft 22 extends. In addition, the rotary disc 32 has a keyway 32.4 confining the keying pin 22.1 which extends diametrically through the drive shaft 22 and provides the driving connection between the shaft and the disc 32.

The bottom disc or header 34 is supported from the brackets 29 by the screws 30 which protrude into tapped apertures in the periphery of the disc. Accordingly, the bottom header disc 34 is rigid with the brackets 29 and with the base 28 of the housing.

The top or upper disc or header 33 has a plurality of radially projecting pins or studs 36 which are threaded into tapped apertures in the disc top header 33. The studs or pins are assembled into the slots 29.1 of the brackets 29 so that the brackets 29 retain the top disc or header 33 from rotating, but accommodate limited movement of the disc 33 along the rotation axis. A coiled compression spring 37 embraces the drive shaft 22 and bears at its lower end against the top of the top disc or header 33, and the spring 37 also bears against and is anchored to the cover 27 of the housing. Accordingly, when the cover 27 is in place, the spring bears downwardly against the top header or disc 33 and urges the stacked discs toward each other and produces and maintains the sealed relationship between the confronting faces of the circle disc.

The bottom stationary header or disc 34, as seen in FIG. 5, has an inlet port 38 through the bottom of the disc; and the inlet port 38 communicates with an elongate arcuate supply manifold groove 39 which extends arcuately about the axis of the shaft 22, and in confronting relation with the metering chambers 35 in the rotary disc 32.

The supply manifold groove 39 is sufficiently long as to continuously span across at least two of the measuring chambers 35 of the disc 32.

The top disc or header 33 has an elongate recirculation manifold groove 40 located on the outer peripheral portion of the disc at a location directly opposite the supply manifold groove 39 of disc 34; and the recirculation manifold groove 40 has a length substantially the same as the length of the supply manifold groove 39.

The top disc or header 33 also has an overflow port or bleeder port 41 through the side of groove 40 and extending radially to the outer periphery of the disc 33 to permit escape of air from the measuring chambers 35 and grooves 39 and 40 and to permit the liquids being measured to spill from the disc 33 and into the interior of the housing 26.

The liquid chemical treatment is supplied to the inlet port by a fitting 42 which has an internally threaded mounting sleeve 43 welded into the conical portion 28.1 of the housing base 28 for connection to the ducts 44 supplying liquid chemical treatment from the pump 12. The fitting 42 also includes a nipple 44 extending into the inlet opening 38 of the bottom disc or header 34. The nipple 44 has an outer diameter which is significantly less than the internal diameter of the inlet opening 38 so that the nipple 44 fits into the inlet opening 38 in loose fitting and non-sealing relation. Accordingly, there is an annular space 45 entirely around the nipple 44 and in the opening 38 through which liquid chemical treatment can flow in a reverse direction, escaping from the inlet opening 38 and into the base 28 of the housing. Of course, adequate quantities of the liquid chemical treatment also flow from the nipple 44 and through the supply manifold groove 39 and into the measuring chambers 35 of the revolving disc 32.

The bottom disc or header 34 also has a discharge manifold groove 46 opening through the flat face 34.1 of the disc 34, providing a discontinuity 47 at the end of the groove accommodating the emptying or discharge of liquids from the measuring chambers 35 of the rotary disc 32.

A discharge or outlet port 48 opens through the bottom of disc 34 and into the manifold groove 46, and the port 48 is located approximately midway between the ends of the groove 46. The groove 46 has its bottom inclined downwardly from both ends of the groove and toward the outlet port 48 so as to drain all of the liquid chemical treatment from the groove 46 without allowing any liquid chemical treatment to remain standing in the groove.

A discharge fitting 49 is provided at the discharge port 48 for discharging the accumulated metered amounts of liquid chemical treatment. The fitting 49 includes an internally threaded connector sleeve 50 extending through and welded into the cone shaped bottom portion 28.1 of the housing base 28. The outlet or discharge fitting also has a nipple 51 which extends upwardly into the discharge opening 48 of the bottom header 34; and the nipple 51 is surrounded by a sealing sleeve or gasket 52 which prevents any escape or leakage of measured liquid chemical treatment, thereby requiring all of the measured liquid to be discharged through the fitting 49 and the connector 50. The connector 50 is connected to the duct 15 which supplies the measured amounts of liquid chemical treatments to the processor by gravity flow.

The top disc or header 33 has an elongate and arcuate relief manifold port 53 extending in its longitudinal portion through the bottom flat surface 33.1 which confronts and seals against the flat end surface 32.1 of the rotary disc 32. The relief manifold groove 53 is located directly opposite the discharge manifold groove 46 in disc 34, and opposite the metering or measuring chambers 35 in the rotary disc 32. The length of manifold groove 53 is approximately the same or slightly less than the length of manifold groove 46.

The top disc or header 33 also has an air relief port 54 extending from the groove 53 and radially to the outer periphery of the disc as to permit air to enter the groove 53 and the metering chambers 35 passing beneath the manifold groove 53.

The bottom disc or header 34 has a shallow circular recess 55 formed in the top flat surface 34.1 of the disc and concentric of the drive shaft 32. A discharge port 56 extends endways through the bottom disc or header 34, communicating with the recess 55 and through the entire thickness of the disc 34 for discharging any leakage amounts of liquid chemical treatment that may migrate into the recess 55.

It will be recognized in FIG. 5, that the end to end spacing between the supply manifold groove 39 and the discharge groove 46, in a direction arcuately around the axis of the disc, is significantly larger than the widths of the narrow land areas a and b, which lie along the sides of the supply manifold groove 39. As a result, if there is any excess pressure in the supply manifold groove 39 as to produce some leaking between the sealing faces of the adjoining discs, the leakage will be across these narrow land areas a and b instead of from the supply manifold groove 39 to the discharge manifold groove 46.

Shaft 22 is seen to extend through apertures or openings 33.2 in the top disc or header 33 and opening or aperture 34.2 in the bottom disc or header 34.

Accordingly, the shaft 22, which revolves with respect to the stationary discs or headers 33 and 34, serves to maintain the three discs 32, 33 and 34 in axial alignment with each other while continuing to revolve the rotary disc 32.

In operation, the motor 21 is operated and the variable pitch pulley 23 is adjusted to produce rotating of the shaft 22 and rotary metering disc 32 at approximately 50 to 60 rpm. Of course, other speeds may be selected and used as different metering capacities are required.

With the housing cover 27 in place, as illustrated in FIG. 1, the spring 37 applies pressure on the top disc or header 33 and urges the top disc 33 and revolving disc 32 downwardly so as to obtain efficient sealing between the confronting flat faces of the three discs, thereby preventing any undesired leakage or flow.

Liquid chemical treatment is pumped from reservoir 13 and through the duct 44.1 and into the inlet fitting or nipple 44. Most of the liquid chemical treatment is directed into the supply manifold groove 39, but significant quantities of the liquid chemical treatment will flow around the outer periphery of the nipple 44 and cascade downwardly through the annular space 45 and again be collected in the base 28 of the housing to be returned to the reservoir. The liquid chemical treatment supplied into the supply manifold groove 39 also moves rapidly into and through the measuring chambers 35 of the metering disc 32 which is revolving. The flowing liquid chemical treatment displaces the air in the measuring chambers 35 and flows into the recirculation manifold groove 40; and a constant spilling of the liquid chemical treatment occurs through the overflow port 41. The spillage is collected within the housing 26 and returns through the base of the housing to the reservoir.

In the grooves 39 and 40, the direction of flow is almost constantly changing due to the continuing movement of empty measuring chambers 35 into alignment with the grooves, along the grooves, and then moving away from the grooves 39 and 40 toward the discharge groove 46. There is a constant flushing of the measuring chambers 35 of the supply manifold groove 39 and of the recirculation groove 40 as to prevent any possibility of any of the solid materials in the liquid chemical treatment from settling out or collecting.

Air is continually being purged from the measuring chambers 35 being filled, and the air discharges through the port 41 with the spilling liquid chemical treatment. As the measuring chambers 35 revolve with the revolving disc 32 in the direction of arrow A, seen in FIG. 3, the measuring chambers are entirely filled and purged of air as their opposite ends confront and are closed by the end faces 34.1 and 33.1 of the bottom and top discs respectively.

As the measuring chambers progressively move with the revolving disc 32 and to the discontinuity 47 in the face 34.1 of the lower disc, the measured amount of liquid chemical treatment in the chamber 35 is immediately drained into the discharge groove 46 and the port 48. Air enters through the relief groove 53 and displaces the liquid chemical treatment which is drained from the chambers 35.

It will be recognized that due to the flushing which occurs in the supply manifold groove 39 and the recirculation groove 40 and the flushing which continuously occurs through the measuring chambers 35 of the rotary disc 32, there will be no changing in the quantities of liquid chemical treatment measured at any one time as compared to the amounts measured at any subsequent time. The inlet port 38 is continuously flushed by the reverse flow of liquid chemical treatment cascading around the outside of the inlet nipple 44. Significant quantities of the liquid chemical treatment are flushed and spilled through the overflow port 41, and all of this liquid chemical treatment is returned through the bottom of the housing to the reservoir to be reused again.

It has been found that with ten measuring chambers 35, each approximately one-half inch in diameter and shaped substantially as illustrated, approximately 60 cc will be measured and delivered for each revolution of the disc 32.

The measuring capacity of the apparatus can be readily and easily changed by simply changing the disc 32 to one having chambers 35 of a different size. Changing of the measuring or metering disc 32 is a simple procedure and requires simply the removal of the cover 27, withdrawal of the shaft 22 from the aligned discs, lifting the top disc 33 by sliding the studs 36 upwardly in the grooves 29.1 of the brackets 29, and then simply lifting off the disc 32 and replacing the disc with another of identical design, but slightly different capacity in the chambers 35. The mechanism will be simply and easily reassembled and the metering device may be put back into operation within only a few minutes.

It will be seen that the present invention utilizes three stacked nylon discs with end faces lying flush against each other in sealing relationship. The center disc is revolved continuously and has metering chambers around its outer periphery. Elongate manifold grooves are provided in the faces of the stationary top and bottom discs to supply liquid chemical treatment into the metering chambers of the revolving metering disc and for recirculating and continuously flushing the measuring chambers and the supply and recirculation manifold grooves in order to prevent any possible settling of solids carried by the liquid chemical treatment. The liquid chemical treatment is continuously spilled from the recirculation groove through an overflow port to assure continuous flushing. The discharge from the measuring chambers is by gravity into the discharge manifold groove and a relief air groove in the top disc supplies air into the measuring chambers so that they may quickly drain as the chambers pass over the discharge manifold groove in the bottom disc or header.

Capacity may be changed by changing the sizes of the measuring chambers in the revolving discs, or by changing the speed produced by the variable speed motor or by a variable speed pulley or transmission between the motor and the rotor of the metering device.

What is claimed is:

1. Apparatus for metering liquids from a supply under pressure, comprising
   a metering rotor revolving about an axis and having flat end faces normal to the rotation axis, the rotor also having a plurality of liquid measuring chambers adjacent the rotor periphery and extending endways entirely through the rotor and opening through both end faces thereof,
   first and second stationary headers respectively confronting opposite ends of the rotor and having flat faces lying flush against the end faces of the rotor, the first header having a supply manifold groove in the flat face thereof and the second header having a recirculation manifold groove in the face thereof, said grooves being opposite each other and opposite the measuring chambers of the rotor and the grooves extending in a circumferential direction about the rotation axis and through a sufficient distance as to span a pair of adjacent measuring chambers in the rotor, the first header having an inlet port communicating with the supply groove for connection to the liquid supply, the second header having an overflow port between the recirculation groove and the exterior of the second header for spilling liquid from the header, the liquid continuously purging air from and flushing the measuring chambers and both manifold grooves as the rotor revolves,
   one of the headers having a discontinuity in the face thereof and spaced from the manifold grooves in a direction arcuately around the rotation axis, the discontinuity accommodating discharge of the liquid from the measuring chambers as the rotor revolves, and discharge means for collecting the liquid discharged from the measuring chambers.

2. Apparatus for metering liquids according to claim 1 and an enclosure embracing the rotor and headers and collecting liquid spilled from the overflow port.

3. Apparatus for metering liquids according to claim 1 and flow confining means receiving the spilled liquid from the overflow port and maintaining the spilled liquid separate from the measured liquid in the discharge means.

4. Apparatus for metering liquids according to claim 1 wherein the supply and recirculation grooves have first ends opposite each other and second ends opposite each other, the inlet port being at the first end of the supply groove and the overflow port being at the second of the recirculation groove.

5. Apparatus for metering liquids according to claim 1 and a supply duct for the liquid and having an inlet fitting extending to the inlet port in leaking relation to the first header for directing liquid into the inlet port and supply groove and simultaneously permitting significant reverse flow of liquid around the fitting and away from the first header causing continuous flushing at the inlet port.

6. Apparatus for metering liquids according to claim 5 wherein the inlet fitting includes a nipple extending into the inlet opening and being spaced from the periphery of the opening.

7. Apparatus for metering liquids according to claim 5 and an enclosure embracing the rotor and headers and collecting the flow of liquid from the overflow port and the reverse flow from the inlet port of the first header, and the enclosure having outlet means for the collected liquid.

8. Apparatus for metering liquids according to claim 1 and the rotation axis being vertical, said one header and the discontinuity therein being below the rotor.

9. Apparatus for metering liquids according to claim 1 and the metering rotor comprising a disc with said measuring chambers being adjacent the outer periphery thereof.

10. Apparatus for metering liquids according to claim 9 and the headers being formed of discs, all of said discs being formed of corrosion resistant material.

11. Apparatus for metering liquids according to claim 10 wherein said first header has said discontinuity, the discontinuity comprising an outlet opening confronting the measuring chambers of the revolving metering rotor through which the liquid is discharged, and the second header having an air port opposite the outlet opening.

12. Apparatus for metering liquids according to claim 11 and the outlet opening and air port having elongate grooves in said flat faces and extending arcuately around the rotation axis.

13. Apparatus for metering liquids according to claim 10 and a housing confining the discs, and a compression spring between the housing and one of the discs to maintain spring pressure on the faces of the disc to effect sealing between said faces.

14. Apparatus for metering liquids according to claim 9 and the metering rotor disc and the headers having axial openings therein, and a drive shaft in said openings and keyed to the rotor disc.

15. Apparatus for metering liquids according to claim 14 and a housing embracing the rotor and headers, the shaft extending to the exterior of the housing, mounting means affixing one of the headers in the housing, slide bracket means in the housing and connected with the other of the headers and accommodating movement thereof against the rotor and toward the other header to maintain the faces in sealed relation, and a spring anchored in the housing and urging the headers and rotors together.

16. Apparatus for metering liquids according to claim 1 wherein said first header has both the inlet port and said discontinuity, the discontinuity comprising an outlet opening confronting the measuring chambers of the revolving metering rotor through which liquid is discharged, and the second header having an air port opposite the outlet opening.

17. Apparatus for metering liquids according to claim 16 and said rotor and said first header cooperating to define a circumferentially extending leakage recess between the rotation axis and the manifold grooves, a leakage discharge port through said first header and communicating with the leakage recess, the distance between the supply manifold groove and the outlet opening exceeding by several times the distances transversely from the manifold groove to the leakage recess and to the outer periphery of the rotor.

18. Apparatus for metering liquids from a supply under pressure, comprising a two part housing having a base and a cover detachably secured together, the base having outlet means for liquid that may be collected therein, a metering disc formed of non-metallic plastic material and revolving about a vertical axis and having flat end faces normal to the rotation axis, the metering disc also having a plurality of liquid measuring chambers spaced about the periphery thereof and extending endways entirely through the disc and opening through both end faces thereof, a rotary drive shaft extending through the cover and into the housing and being detachably keyed to the metering disc for revolving the disc, top and bottom stationary header discs also formed of non-metallic plastic material and respectively disposed above and below the metering disc, said header discs having flat faces confronting and lying flush against the end faces of the metering disc and in liquid sealing relation therewith, the bottom header disc supporting the metering disc and the top header disc, the top and bottom header discs having axially extending bearing apertures receiving the revolving drive shaft and permitting the metering disc to revolve with the shaft while the header discs remain stationary, a compression spring between the top header disc and the cover of the housing and applying sealing pressure on the faces of the metering and header discs, the bottom header disc having a supply manifold groove in the flat face thereof and the top header disc having a recirculation manifold groove in the flat face thereof, said grooves being opposite each other and opposite the measuring chambers of the rotor and extending circumferentially of the header discs a sufficient distance as to span a pair of adjacent measuring chambers in the metering disc, the bottom header disc having an inlet port from the supply groove, an inlet fitting connected to supply duct means extending out of the base of the housing for connection to the liquid supply, the inlet fitting having a nipple extending into the inlet port in loose fitting relation to allow liquid to cascade down from the inlet while also being directed into the manifold grooves and measuring chambers, the top header disc having an overflow port between the recirculation groove and the exterior of the top header disc for spilling liquid from the recirculation groove, said inlet port and said overflow port being spaced from each other in a circumferential direction relative to the rotation axis, the liquid from the inlet port continuously flushing the measuring chambers of the metering disc and both manifold grooves of the header discs as the metering disc revolves, the bottom header disc having an outlet manifold groove in the flat face thereof, and the top header disc having an air relief manifold groove, said outlet groove and air relief groove being opposite each other and opposite the measuring chambers of the metering disc, the bottom header disc having an outlet opening and discharge fitting and duct means connected thereto and extending to the exterior of the housing base, the top header disc having an air access port therethrough and extending to the air relief manifold groove, bracket means in the base of the housing and supporting the bottom header disc, said bracket means also retaining the top header disc against revolving while permitting the top header disc to be urged downwardly by the spring for maintaining sealing pressure between the faces of the header disc and metering disc.

19. Apparatus for metering liquids according to claim 18 and agricultural seed treating means connected with the outlet duct means for receiving metered liquids therefrom, said seed treating means applying the metered liquid to seeds, and variable speed driving means including an electric motor for driving the drive shaft and the metering disc to accommodate varying the rate of feeding the liquid to the seed treating means.

* * * * *